(12) United States Patent
Kotalwar et al.

(10) Patent No.: US 11,579,949 B2
(45) Date of Patent: Feb. 14, 2023

(54) DEVICE APPLICATION SUPPORT

(71) Applicant: Nokia Solutions and Networks Oy, Espoo (FI)

(72) Inventors: Jayant Kotalwar, Cupertino, CA (US); Suresh Kannan Durai Samy, Sunnyvale, CA (US); Kendall Harvey, San Jose, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/353,592

(22) Filed: Mar. 14, 2019

(65) Prior Publication Data
US 2020/0293389 A1 Sep. 17, 2020

(51) Int. Cl.
G06F 7/06 (2006.01)
G06F 9/54 (2006.01)

(52) U.S. Cl.
CPC ........ *G06F 9/547* (2013.01); *G06F 2209/549* (2013.01)

(58) Field of Classification Search
CPC combination set(s) only.
See application file for complete search history.

(56) References Cited

U.S. PATENT DOCUMENTS

| 5,826,269 | A  | 10/1998 | Hussey |
| 6,212,513 | B1 | 4/2001  | Shiratori |
| 7,047,563 | B1 | 5/2006  | Weber et al. |
| 7,356,601 | B1 | 4/2008  | Clymer et al. |
| 7,441,018 | B1 | 10/2008 | Shafer |
| 7,660,805 | B2 | 2/2010  | Chan |
| 9,143,412 | B1 | 9/2015  | Nay et al. |

(Continued)

FOREIGN PATENT DOCUMENTS

| WO | WO 2018/118478 A1 | 6/2018 |
| WO | WO 2018/127747 A1 | 7/2018 |
| WO | WO 2019/027934 A1 | 2/2019 |

OTHER PUBLICATIONS

Tahara, D., et al., "Sinew: A SQL System for Multi-Structured Data," Proceedings of the 2014 ACM Sigmod International Conference on Management of Data, SIGMOD 2014, Jun. 22, 2014, pp. 815-826.

(Continued)

*Primary Examiner* — Timothy A Mudrick
*Assistant Examiner* — Abdou K Seye
(74) *Attorney, Agent, or Firm* — Tong, Rea, Bentley & Kim, LLC

(57) ABSTRACT

Various example embodiments for providing device application support are presented. In at least some example embodiments, device application support may be configured to support device programmability. In at least some example embodiments, device application support may be configured to support device programmability for enabling a customer that operates a device to develop a customer application for the device and to run the customer application on the device. In at least some example embodiments, device application support may be provided in a manner for enabling a customer to develop and run a customer application for a device without a need for the customer to use a software development kit (SDK) to develop the customer application.

22 Claims, 5 Drawing Sheets

(56) References Cited

U.S. PATENT DOCUMENTS

| | | |
|---|---|---|
| 9,201,739 B1 | 12/2015 | Bagchi |
| 9,245,088 B1 | 1/2016 | O'Riordan |
| 9,489,423 B1 | 11/2016 | Muthiah |
| 9,509,549 B2* | 11/2016 | Pruss .................. H04L 41/0206 |
| 10,129,232 B1 | 11/2018 | Phuong et al. |
| 2002/0016771 A1 | 2/2002 | Carothers |
| 2002/0165961 A1 | 11/2002 | Everdell et al. |
| 2004/0268125 A1 | 12/2004 | Clark |
| 2005/0289525 A1 | 12/2005 | David |
| 2006/0036721 A1 | 2/2006 | Zhao |
| 2006/0041650 A1 | 2/2006 | Luo |
| 2006/0224576 A1 | 10/2006 | Liu |
| 2007/0061786 A1 | 3/2007 | Zhou |
| 2007/0180127 A1 | 8/2007 | Vuori |
| 2008/0059631 A1 | 3/2008 | Bergstrom |
| 2008/0080438 A1 | 4/2008 | Gopalakrishnan et al. |
| 2008/0242247 A1 | 10/2008 | Shaffer et al. |
| 2008/0275975 A1 | 11/2008 | Pandey |
| 2009/0193126 A1 | 7/2009 | Agarwal et al. |
| 2010/0138534 A1 | 6/2010 | Mutnuru et al. |
| 2010/0205471 A1 | 8/2010 | Vavilala et al. |
| 2011/0099255 A1 | 4/2011 | Srinivasan |
| 2012/0144453 A1 | 6/2012 | Bolik |
| 2012/0290429 A1 | 11/2012 | Ostroff |
| 2014/0074517 A1 | 3/2014 | Sylvester |
| 2015/0169302 A1 | 6/2015 | DeAnna |
| 2015/0169717 A1 | 6/2015 | Wang |
| 2015/0271016 A1 | 9/2015 | Seligson et al. |
| 2016/0164953 A1 | 6/2016 | Rostislav |
| 2016/0302063 A1 | 10/2016 | Ahmed |
| 2017/0094033 A1 | 3/2017 | Sathyadevan |
| 2017/0171102 A1 | 6/2017 | Parker et al. |
| 2017/0286502 A1 | 10/2017 | Bar-Or |
| 2017/0286526 A1 | 10/2017 | Bar-Or |
| 2017/0374174 A1* | 12/2017 | Evens .................. H04L 67/322 |
| 2018/0131745 A1* | 5/2018 | Shakir ................ H04L 43/0817 |
| 2018/0165366 A1 | 6/2018 | Kumar |
| 2018/0232456 A1 | 8/2018 | Sherman |
| 2018/0338002 A1 | 11/2018 | Sherrill |
| 2019/0012211 A1 | 1/2019 | Selvaraj |
| 2019/0065533 A1 | 2/2019 | Pulaski |
| 2019/0095252 A1 | 3/2019 | Tseng et al. |
| 2019/0102409 A1* | 4/2019 | Shi ...................... H04L 67/2823 |
| 2019/0182028 A1* | 6/2019 | Arquero ............... G06K 9/6227 |
| 2019/0236470 A1 | 8/2019 | Chauhan |
| 2019/0306242 A1* | 10/2019 | Thummalapalli ... H04L 41/5003 |
| 2019/0319885 A1* | 10/2019 | Fan ...................... H04L 67/322 |
| 2019/0327236 A1 | 10/2019 | Ahuja |
| 2020/0004866 A1 | 1/2020 | Dilts |
| 2020/0004872 A1 | 1/2020 | Dilts |
| 2020/0057918 A1 | 2/2020 | Shin |
| 2020/0097910 A1 | 3/2020 | Krasnov |
| 2020/0162462 A1 | 5/2020 | Zayats |
| 2020/0233719 A1 | 8/2020 | Saini |
| 2020/0250152 A1 | 8/2020 | Pulaski |
| 2020/0264934 A1 | 8/2020 | Jayaraman |
| 2020/0272608 A1 | 8/2020 | Dilts |

OTHER PUBLICATIONS

EP Search Report mailed in corresponding EP Application No. 20163182.7 dated Aug. 5, 2020, 22 pages.

Omnikrys, "How to import data from text file to mysql database," https://stackoverflow.com/questions/13579810/how-to-import-data-from-text-file-to-mysql-database, printed on Sep. 9, 2020, 6 pages.

* cited by examiner

DEVICE APPLICATION SUPPORT

TECHNICAL FIELD

Various example embodiments relate generally to communication systems, more particularly but not exclusively, to device management in communication systems.

BACKGROUND

Various types of devices (e.g., routers, servers, and so forth) may operate in various types of environments (e.g., communication networks, datacenters, enterprises, home networks, and so forth).

SUMMARY

In at least some example embodiments, an apparatus includes at least one processor and at least one memory including program code, wherein the at least one memory and the program code are configured to, with the at least one processor, cause the apparatus to at least receive, by a service manager of a device, a remote procedure call including a request for execution of a function on the device based on one or more capabilities of the device and initiate, by the service manager of the device based on the remote procedure call, execution of the function on the device based on the one or more capabilities of the device. In at least some example embodiments, the service manager is configured to provide a software development kit (SDK) service for the device. In at least some example embodiments, the at least one memory and the program code are configured to, with the at least one processor, cause the apparatus to at least expose, by the service manager of the device, device capability information indicative of the one or more capabilities of the device. In at least some example embodiments, the request for execution of the function on the device based on the one or more capabilities of the device is received from an application. In at least some example embodiments, the application is running on a second device that is remote from the device. In at least some example embodiments, the application is running on the device. In at least some example embodiments, the request for execution of the function on the device based on the one or more capabilities of the device includes a request to register the application with the service manager of the device. In at least some example embodiments, the request for execution of the function on the device based on the one or more capabilities of the device includes a request for execution of a control function associated with programmability of the device. In at least some example embodiments, the request for execution of the function on the device based on the one or more capabilities of the device includes at least one of a request to manage a resource on the device or a request to monitor for an event on the device. In at least some example embodiments, the service manager includes a daemon configured to listen for the remote procedure call. In at least some example embodiments, the remote procedure call is based on gRPC. In at least some example embodiments, to initiate execution of the function on the device based on the one or more capabilities of the device, the at least one memory and the program code are configured to, with the at least one processor, cause the apparatus to at least convert, by the service manager of the device, the request for execution of the function on the device based on the one or more capabilities of the device into one or more device commands supported by the device and initiate, by the service manager of the device, execution the one or more device commands supported by the device. In at least some example embodiments, the at least one memory and the program code are configured to, with the at least one processor, cause the apparatus to at least provide, by the service manager of the device, a response associated with the request for execution of the function on the device based on the one or more capabilities of the device. In at least some example embodiments, the device is a router.

In at least some example embodiments, a non-transitory computer-readable medium includes instructions configured to cause an apparatus to at least receive, by a service manager of a device, a remote procedure call including a request for execution of a function on the device based on one or more capabilities of the device and initiate, by the service manager of the device based on the remote procedure call, execution of the function on the device based on the one or more capabilities of the device. In at least some example embodiments, the service manager is configured to provide a software development kit (SDK) service for the device. In at least some example embodiments, the non-transitory computer-readable medium includes instructions configured to cause the apparatus to at least expose, by the service manager of the device, device capability information indicative of the one or more capabilities of the device. In at least some example embodiments, the request for execution of the function on the device based on the one or more capabilities of the device is received from an application. In at least some example embodiments, the application is running on a second device that is remote from the device. In at least some example embodiments, the application is running on the device. In at least some example embodiments, the request for execution of the function on the device based on the one or more capabilities of the device includes a request to register the application with the service manager of the device. In at least some example embodiments, the request for execution of the function on the device based on the one or more capabilities of the device includes a request for execution of a control function associated with programmability of the device. In at least some example embodiments, the request for execution of the function on the device based on the one or more capabilities of the device includes at least one of a request to manage a resource on the device or a request to monitor for an event on the device. In at least some example embodiments, the service manager includes a daemon configured to listen for the remote procedure call. In at least some example embodiments, the remote procedure call is based on gRPC. In at least some example embodiments, to initiate execution of the function on the device based on the one or more capabilities of the device, the non-transitory computer-readable medium includes instructions configured to cause the apparatus to at least convert, by the service manager of the device, the request for execution of the function on the device based on the one or more capabilities of the device into one or more device commands supported by the device and initiate, by the service manager of the device, execution the one or more device commands supported by the device. In at least some example embodiments, the non-transitory computer-readable medium includes instructions configured to cause the apparatus to at least provide, by the service manager of the device, a response associated with the request for execution of the function on the device based on the one or more capabilities of the device. In at least some example embodiments, the device is a router.

In at least some example embodiments, a method includes receiving, by a service manager of a device, a remote procedure call including a request for execution of a function on the device based on one or more capabilities of the device and initiating, by the service manager of the device based on the remote procedure call, execution of the function on the device based on the one or more capabilities of the device. In at least some example embodiments, the service manager is configured to provide a software development kit (SDK) service for the device. In at least some example embodiments, the method includes exposing, by the service manager of the device, device capability information indicative of the one or more capabilities of the device. In at least some example embodiments, the request for execution of the function on the device based on the one or more capabilities of the device is received from an application. In at least some example embodiments, the application is running on a second device that is remote from the device. In at least some example embodiments, the application is running on the device. In at least some example embodiments, the request for execution of the function on the device based on the one or more capabilities of the device includes a request to register the application with the service manager of the device. In at least some example embodiments, the request for execution of the function on the device based on the one or more capabilities of the device includes a request for execution of a control function associated with programmability of the device. In at least some example embodiments, the request for execution of the function on the device based on the one or more capabilities of the device includes at least one of a request to manage a resource on the device or a request to monitor for an event on the device. In at least some example embodiments, the service manager includes a daemon configured to listen for the remote procedure call. In at least some example embodiments, the remote procedure call is based on gRPC. In at least some example embodiments, initiating execution of the function on the device based on the one or more capabilities of the device includes converting, by the service manager of the device, the request for execution of the function on the device based on the one or more capabilities of the device into one or more device commands supported by the device and initiating, by the service manager of the device, execution the one or more device commands supported by the device. In at least some example embodiments, the method includes providing, by the service manager of the device, a response associated with the request for execution of the function on the device based on the one or more capabilities of the device. In at least some example embodiments, the device is a router.

In at least some example embodiments, an apparatus includes means for receiving, by a service manager of a device, a remote procedure call including a request for execution of a function on the device based on one or more capabilities of the device and means for initiating, by the service manager of the device based on the remote procedure call, execution of the function on the device based on the one or more capabilities of the device. In at least some example embodiments, the service manager is configured to provide a software development kit (SDK) service for the device. In at least some example embodiments, the apparatus includes means for exposing, by the service manager of the device, device capability information indicative of the one or more capabilities of the device. In at least some example embodiments, the request for execution of the function on the device based on the one or more capabilities of the device is received from an application. In at least some example embodiments, the application is running on a second device that is remote from the device. In at least some example embodiments, the application is running on the device. In at least some example embodiments, the request for execution of the function on the device based on the one or more capabilities of the device includes a request to register the application with the service manager of the device. In at least some example embodiments, the request for execution of the function on the device based on the one or more capabilities of the device includes a request for execution of a control function associated with programmability of the device. In at least some example embodiments, the request for execution of the function on the device based on the one or more capabilities of the device includes at least one of a request to manage a resource on the device or a request to monitor for an event on the device. In at least some example embodiments, the service manager includes a daemon configured to listen for the remote procedure call. In at least some example embodiments, the remote procedure call is based on gRPC. In at least some example embodiments, the means for initiating execution of the function on the device based on the one or more capabilities of the device includes means for converting, by the service manager of the device, the request for execution of the function on the device based on the one or more capabilities of the device into one or more device commands supported by the device and means for initiating, by the service manager of the device, execution the one or more device commands supported by the device. In at least some example embodiments, the apparatus includes means for providing, by the service manager of the device, a response associated with the request for execution of the function on the device based on the one or more capabilities of the device. In at least some example embodiments, the device is a router.

In at least some example embodiments, an apparatus includes at least one processor and at least one memory including program code, wherein the at least one memory and the program code are configured to, with the at least one processor, cause the apparatus to at least send, by an application toward a service manager of a device, a remote procedure call including a request for execution of a function on the device based on one or more capabilities of the device and receive, by the application from the service manager of the device, a response associated with the request for execution of the function on the device based on the one or more capabilities of the device. In at least some example embodiments, the service manager is configured to provide a software development kit (SDK) service for the device. In at least some example embodiments, the application is running on a second device that is remote from the device. In at least some example embodiments, the application is running on the device. In at least some example embodiments, the request for execution of the function on the device based on the one or more capabilities of the device includes a request to register the application with the service manager of the device. In at least some example embodiments, the request for execution of the function on the device based on the one or more capabilities of the device includes a request for execution of a control function associated with programmability of the device. In at least some example embodiments, the request for execution of the function on the device based on the one or more capabilities of the device includes at least one of a request to manage a resource on the device or a request to monitor for an event on the device. In at least some example embodiments, the remote procedure call is based on gRPC. In at least some example embodiments, the at least one memory and the program code are configured to, with the at least one processor, cause the apparatus to at least receive, from the device, device capability information indicative of the one or more capabilities of the device, receive, from a remote device, a remote procedure call tool, and create, based on the device capabilty information and the remote procedure call tool, the application.

In at least some example embodiments, a non-transitory computer-readable medium includes instructions configured to cause an apparatus to at least send, by an application toward a service manager of a device, a remote procedure call including a request for execution of a function on the device based on one or more capabilities of the device and receive, by the application from the service manager of the device, a response associated with the request for execution of the function on the device based on the one or more capabilities of the device. In at least some example embodiments, the service manager is configured to provide a software development kit (SDK) service for the device. In at least some example embodiments, the application is running on a second device that is remote from the device. In at least some example embodiments, the application is running on the device. In at least some example embodiments, the request for execution of the function on the device based on the one or more capabilities of the device includes a request to register the application with the service manager of the device. In at least some example embodiments, the request for execution of the function on the device based on the one or more capabilities of the device includes a request for execution of a control function associated with programmability of the device. In at least some example embodiments, the request for execution of the function on the device based on the one or more capabilities of the device includes at least one of a request to manage a resource on the device or a request to monitor for an event on the device. In at least some example embodiments, the remote procedure call is based on gRPC. In at least some example embodiments, the non-transitory computer-readable medium includes instructions configured to cause the apparatus to at least receive, from the device, device capability information indicative of the one or more capabilities of the device, receive, from a remote device, a remote procedure call tool, and create, based on the device capabilty information and the remote procedure call tool, the application.

In at least some example embodiments, a method includes sending, by an application toward a service manager of a device, a remote procedure call including a request for execution of a function on the device based on one or more capabilities of the device and receiving, by the application from the service manager of the device, a response associated with the request for execution of the function on the device based on the one or more capabilities of the device. In at least some example embodiments, the service manager is configured to provide a software development kit (SDK) service for the device. In at least some example embodiments, the application is running on a second device that is remote from the device. In at least some example embodiments, the application is running on the device. In at least some example embodiments, the request for execution of the function on the device based on the one or more capabilities of the device includes a request to register the application with the service manager of the device. In at least some example embodiments, the request for execution of the function on the device based on the one or more capabilities of the device includes a request for execution of a control function associated with programmability of the device. In at least some example embodiments, the request for execution of the function on the device based on the one or more capabilities of the device includes at least one of a request to manage a resource on the device or a request to monitor for an event on the device. In at least some example embodiments, the remote procedure call is based on gRPC. In at least some example embodiments, the method includes receiving, from the device, device capability information indicative of the one or more capabilities of the device, receiving, from a remote device, a remote procedure call tool, and creating, based on the device capabilty information and the remote procedure call tool, the application.

In at least some example embodiments, an apparatus includes means for sending, by an application toward a service manager of a device, a remote procedure call including a request for execution of a function on the device based on one or more capabilities of the device and means for receiving, by the application from the service manager of the device, a response associated with the request for execution of the function on the device based on the one or more capabilities of the device. In at least some example embodiments, the service manager is configured to provide a software development kit (SDK) service for the device. In at least some example embodiments, the application is running on a second device that is remote from the device. In at least some example embodiments, the application is running on the device. In at least some example embodiments, the request for execution of the function on the device based on the one or more capabilities of the device includes a request to register the application with the service manager of the device. In at least some example embodiments, the request for execution of the function on the device based on the one or more capabilities of the device includes a request for execution of a control function associated with programmability of the device. In at least some example embodiments, the request for execution of the function on the device based on the one or more capabilities of the device includes at least one of a request to manage a resource on the device or a request to monitor for an event on the device. In at least some example embodiments, the remote procedure call is based on gRPC. In at least some example embodiments, the apparatus includes means for receiving, from the device, device capability information indicative of the one or more capabilities of the device, means for receiving, from a remote device, a remote procedure call tool, and means for creating, based on the device capabilty information and the remote procedure call tool, the application.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
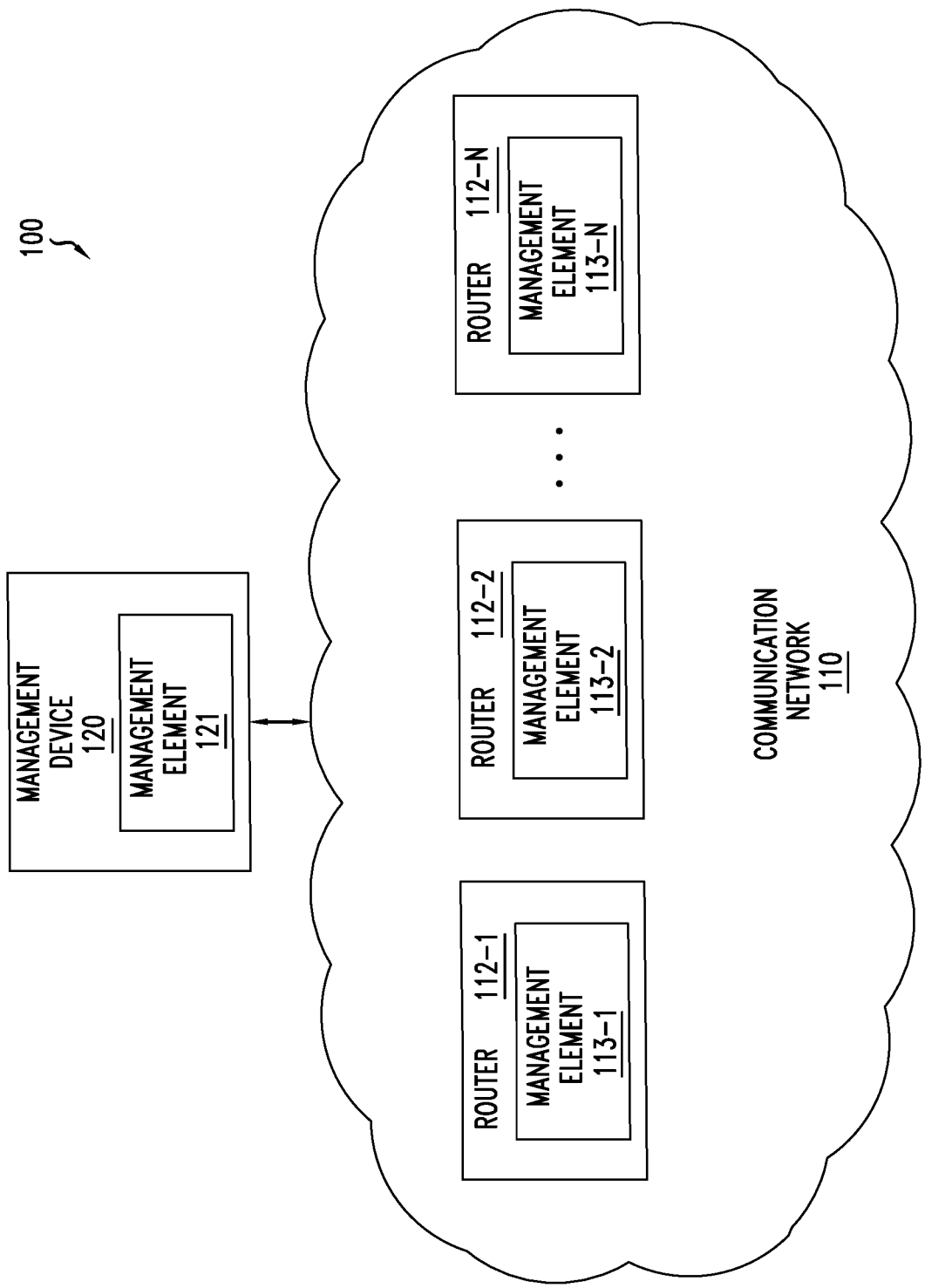
FIG. 1 depicts an example embodiment of a communication system including a communication network and a management device configured to manage the communication network.

Various example embodiments for providing device application support are presented. In at least some example embodiments, device application support may be configured to support device programmability. In at least some example embodiments, device application support may be configured to support device programmability for enabling a customer to develop a customer application for the device and to run the customer application on the device. In at least some example embodiments, device application support may be provided in a manner for enabling a customer to develop and run a customer application for a device without a need for the customer to use a software development kit (SDK) to develop the customer application. In at least some example embodiments, device application support may be configured to enable a customer that operates a device to develop a customer device application for the device and to run the customer device application on the device based on use of remote procedure calls. In at least some example embodiments, development of the customer device application for the device may be supported by a customer device that is configured to receive, from the device, capability information indicative of one or more capabilities of the device, receive a remote procedure call tool, and create, based on the device capability information and the remote procedure call tool, the customer device application. In at least some example embodiments, running of the customer device application may be supported by a service manager on the device that is configured to receive a remote procedure call including a request for execution of a function on the device based on one or more capabilities of the device, initiate, based on the remote procedure call, execution of the function on the device based on the one or more capabilities of the device, and provide a response associated with the request for execution of the function on the device based on the one or more capabilities of the device. The service manager may be a service manager configured to provide an SDK service on the device (and, thus, which also may be referred to herein as an SDK service manager). The running of the customer device application may include installing the customer device application on the device and running it locally on the device using remote procedure calls within the device or by running the customer device application on a customer device remote from the device and using remote procedure calls to enable the customer device application to interact with the device as if it is running on the device. It will be appreciated that these and various other example embodiments presented herein may be used or adapted for use in providing device application support for various types of devices (e.g., routers, servers, or the like); however, for purposes of clarity in describing various example embodiments of device application support, various example embodiments of device application support presented herein are primarily described within the context of providing device application support for routers, as discussed further below. It will be appreciated that the customer of the device may be an owner of the device, an operator of the device, or other suitable customer of the device (e.g., entity, person, device, program, application, or the like). It will be appreciated that these and various other example embodiments and advantages or potential advantages of providing device application support may be further understood by way of reference to the various figures, which are discussed further below.

Various example embodiments for providing router application support are presented. In at least some example embodiments, router application support may be configured to support router programmability. In at least some example embodiments, router application support may be configured to support router programmability for enabling a customer that operates a router to develop a customer router application for the router and to run the customer router application on the router. In at least some example embodiments, router application support may be provided in a manner for enabling a customer to develop and run a customer router application for a router without a need for the customer to use an SDK to develop the customer router application. In at least some example embodiments, router application support may be configured to enable a customer that operates a router to develop a customer router application for the router and to run the customer router application on the router based on use of remote procedure calls. In at least some example embodiments, development of the customer router application for the router may be supported by a customer device that is configured to receive, from the router, router capability information indicative of one or more capabilities of the router (e.g., a set of router capability files), receive a remote procedure call tool, and create, based on the router capability information and the remote procedure call tool, the customer router application. In at least some example embodiments, running of the customer router application may be supported by SDK service manager on the router that is configured to receive a remote procedure call including a request for execution of a function on the router based on one or more capabilities of the router, initiate, based on the remote procedure call, execution of the function on the router based on the one or more capabilities of the router, and provide a response associated with the request for execution of the function on the router based on the one or more capabilities of the router. The running of the customer router application may include installing the customer router application on the router and running it locally on the router using remote procedure calls within the router or by running the customer router application on a customer device remote from the router and using remote procedure calls to enable the customer router application to interact with the router as if it is running on the router. It will be appreciated, although primarily presented herein within the context of example embodiments for providing device router application support for routers, various example embodiments presented herein may be used or adapted for use in providing device router application support for various other types of devices (e.g., switches, servers, or the like). It will be appreciated that these and various other example embodiments and advantages or potential advantages of providing router application support may be further understood by way of reference to the various figures, which are discussed further below.

FIG. 1 depicts an example embodiment of a communication system including a communication network and a management device configured to manage the communication network.

The communication system 100, as indicated above, includes a communication network 110 and a management device 120 configured to manage the communication network 110.

The communication network 110 may include any network which may be managed by a management device 120.

For example, the communication network 110 may be an operator network, an enterprise network, or the like. For example, the communication network 110 may be an access network, a core network, a backhaul network, a datacenter network, or the like. For example, the communication network 110 may be a physical communication network, a virtualized communication network (e.g., virtualized based on network function virtualization (NFV) techniques or other suitable virtualization techniques), or the like. It will be appreciated that, although primarily presented herein within the context of specific types of communication networks, various other types of communication networks may be supported.

The communication network 110 includes a set of routers 112-1-112-N (collectively, routers 112). The routers 112 may be configured to provide various communication services for supporting communications within communication network 110. The routers 112 may be arranged in various network topologies, which may depend on the type of communication network 110 in which the routers 112 are disposed. For example, the routers 112 may be arranged in a mesh topology (e.g., in a network operator backhaul network), in a spine-and-leaf topology (e.g., in a datacenter network), or the like. The routers 112 may be configured to be managed by the management device 120. It will be appreciated that, although primarily presented herein as including specific types devices (illustratively, routers 112), communication network 110 may include various other types of devices (e.g., switches, hubs, bridges, or the like, as well as various combinations thereof).

The management device 120 may be configured to support management of the communication network 110. The management device 120 may be configured to support management of the communication network 110 for various management purposes, at various management scales, or the like, as well as various combinations thereof. For example, the management device 120 may be configured to support configuration functions, monitoring functions, maintenance functions, or the like, as well as various combinations thereof. For example, the management device 120 may be configured to support service-level management (e.g., as a service management system or other similar system), network-level management (e.g., as a network management system (NMS) or other similar system), element-level management (e.g., as an element management system (EMS) or other similar system), or the like, as well as various combinations thereof The management device 120 may be one of various types of devices which may be used to support management functions for communication network 110, such as a workstation of a management system configured to support management of the routers 112, a user device (e.g., a laptop, a tablet, a smartphone, or the like) configured to provide remote management access to the routers 112, a local console connected to one or more of the routers 112, or the like. It will be appreciated that the management device 120 may be configured to support various other management capabilities for managing the communication network 110.

The management device 120 is configured to manage the routers 112 of communication network 110. The management device 120 may support various capabilities which enable the management system 120 to access and manage routers 112 and, similarly, routers 112 may support various capabilities which enable access and management by the management device 120. For example, such capabilities may include management interfaces (e.g., command line interfaces (CLIs), graphical user interfaces (GUIs), or the like), management applications (e.g., router configuration applications, router status retrieval applications, or the like), management elements (e.g., devices, modules, systems, subsystems or the like), communications capabilities (e.g., inter-process communications capabilities such as remote procedure calls (RPCs), protocols such as telnet or secure shell (SSH), or the like), or the like, as well as various combinations thereof. It will be appreciated that these capabilities may be considered to be represented in FIG. 1 by the management elements 113-1-113-N on routers 112-1-112-N, respectively, and the management element 121 on management device 120.

In at least some embodiments, for example, the communication network 110 may be configured to support router application support. In at least some embodiments, for example, a router 112 of the managed environment 110 and the management device 120 may be configured to cooperate in order to provide router application support. An example embodiment for providing router application support is presented in FIG. 2.

It will be appreciated that, although primarily presented with respect to specific types, numbers, and arrangements of elements, communication system 100 may include various other types, numbers and arrangements of elements.

Figure 2:
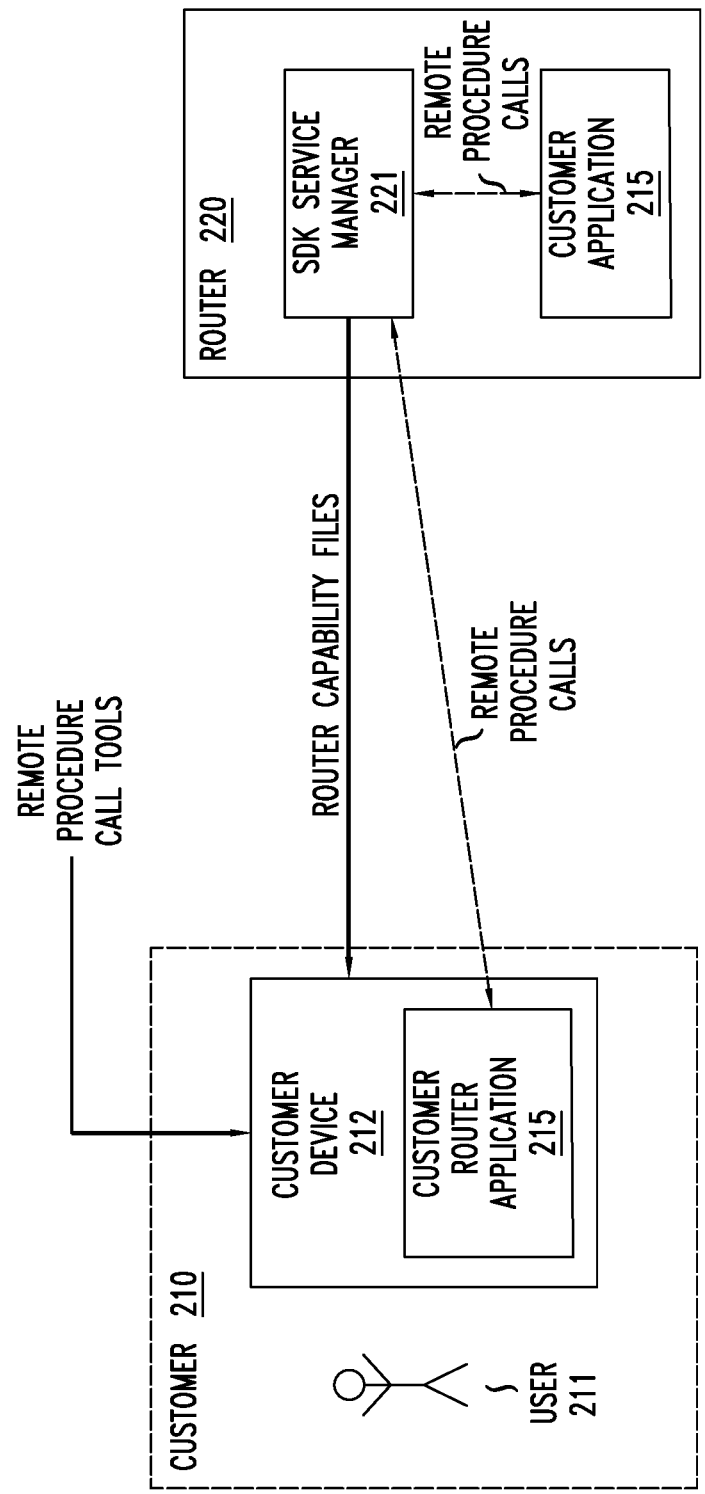
FIG. 2 depicts an example embodiment of a system configured to provide customer router application support including support for development and use of customer router applications.

FIG. 2 depicts an example embodiment of a system configured to provide router application support including support for development and use of customer router applications.

The system 200 is configured to provide router application support to a customer 210 that is operating a router 220. A user 211 of the customer 210, using a customer device 212 of the customer 210, is able to develop a customer router application 215 for the router 220 and run the customer router application 215 for the router 220. It will be appreciated that, although primarily presented herein with respect to embodiments in which the user 211 is a human user, various example embodiments presented herein may be used or adapted for use in conjunction with non-human users which may be associated with a customer device (e.g., a device, a program, an application, or the like). The customer router application 215 may be configured to enable the customer 210 to perform various functions on the router 220. For example, the customer router application 215 may be configured to perform functions such as route control (e.g., add route, delete route, or the like) for various route types (e.g., Internet Protocol (IP) routing, Multiprotocol Label Switching (MPLS) routing, or the like), router event monitoring (e.g., IP routing events, MPLS routing events, Bidirectional Forwarding Detection (BFD) session events (e.g. session creation, session termination, or the like), Layer 3 (L3) interface up/down events, or the like), or the like, as well as various combinations thereof The system 200, as discussed above, is configured to support development, by the customer 210, of the customer router application 215 for the router 220.

The router 220 exposes router functionality of the router 220 to the customer 210 for use by the customer 210 in developing the customer router application 215. The router functionality of the router 220 may be exposed in the form of router capability information indicative of one or more capabilities of the router 220, which is illustrated in FIG. 2 as being in the form of router capability files (which also may be referred to herein as .proto files). The .proto files indicate the functions of the router 220 that are available to the customer 210 (e.g., for use in the customer router application 215 that will be developed by the customer 210). For example, the functions of the router 220 that are exposed as part of the router functionality may include route control functions (e.g., add route, delete route, or the like) for various route types (e.g., IP routing, MPLS routing, or the like), router event monitoring functions (e.g., IP routing events, MPLS routing events, BFD session events (e.g. session creation, session termination, or the like), L3 interface up/down events, or the like), or the like, as well as various combinations thereof. The router functionality exposed by the router 220 may be defined based on remote procedure calls. For example, the router functionality exposed by the router 220 may define procedure calls available on the router 220 (e.g., for each of the procedure calls available on the router 220, an identification of the procedure call, an indication of arguments expected for the procedure call, an indication of the format of the procedure call, or the like, as well as various combinations thereof). The router functionality exposed by the router 220 may be organized on a release basis (e.g., providing an indication as to new functionality provided in the most recent release of the router 220). The router functionality of the router 220 may be exposed by providing the router capability files to the remote procedure call interface of the router 220 (e.g., a gRPC interface of the router 220) for exposure by the router 220. The router functionality exposed by the router 220 is received by the customer device 212 of the customer 210.

The customer 210 develops the customer router application 215 based on the router functionality exposed by the router 220 and received by the customer device 212 of the customer 210. The customer 210 may develop the customer router application 215 based on use of remote procedure call tools available to the customer 210. The remote procedure call tools may include remote procedure call tools available to the customer 210 via the Internet. The remote procedure call tools may be based on various remote procedure call protocols (e.g., gRPC or the like). The customer 210 may develop the customer router application 215 based on compiling of the router capability files using the remote procedure call tools. There are a wide variety of gRPC tools available and gRPC supports may programming languages (e.g., python, c++, c, java, golang, and so forth). The customer 210 develops the customer router application 215 to include remote procedure calls that are based on the remote procedure call methods defined in the router capability files, such that the remote procedure calls may be executed to run the customer router application 215 for interaction with the router 210. In this manner, the customer 210 is able to develop its customer router application 210 for the router 220 based on its own needs and on its own machine, based on the remote procedure call tools (e.g., gRPC) and the router capability files (e.g., .proto files), without a need for knowledge or use of the SDK supported by the router 220.

The customer 210 runs the customer router application 215 for interaction by the customer router application 215 with the router 220 (e.g., control the router 220, perform functions on the router 220, or the like). The router 220 supports running of the customer router application 215 based on an SDK service manager 221 running on the router 220. The SDK service manager 221 runs on the router 220 and listens for remote procedure calls, such as remote procedure calls that may come from the customer router application 215. The remote procedure calls may be based on the remote procedure call protocol utilized by the router 220 (e.g., gRPC or the like) and, thus, indicated in the router capability files exposed by the router 220 and used by the customer 210 as a basis for development of the customer router application 215 for the router 220.

The customer router application 215 may register with the SDK service manager 221 of the router 220 before interacting with the router 220. The customer router application 215 may register with the SDK service manager 221 by sending a registration request to the router 220. The registration request may be sent as a remote procedure call which may be detected by the SDK service manager 221 which is listening for remote procedure calls. The registration request may include registration information configured for enabling registration of the customer router application 215 with the SDK service manager 221 of the router 220 (e.g., the application name of the application, one or more other parameters of the application such as keep-alive or other parameters, and so forth).

The customer router application 215 may interact with the router 215 after registering with the SDK service manager 221 of the router 220. The customer router application 215 may interact with the router 220 based on one or more remote procedure calls by the customer router application 215 which may be detected by the SDK service manager 221 which is listening for remote procedure calls. The remote procedure calls may be indicative of actions requested by the customer router application 215 for router 220 (e.g., route control, router event monitoring, or the like, as well as various combinations thereof). The SDK service manager 221 receives the remote procedure calls from the customer router application 215 and initiates execution of the actions requested in the remote procedure calls from the customer router application 215. The router 220 executes the actions requested by the customer router application 215. The SDK service manager 221 determines the results of execution of the actions requested by the customer router application 215. The SDK service manager 221 sends the results of the execution of the actions requested by the customer router application 215 to the customer router application 215.

It will be appreciated that the running of the customer router application 215 may include installing the customer router application 215 on the router 220 and running it locally on the router 220 using remote procedure calls within the router 220 (e.g., the remote procedure calls from the customer router application 215 to the SDK service manager 221 are within the router 220) or by running the customer router application 215 on a customer device remote from the router 220 (e.g., customer device 220) and using remote procedure calls to enable the customer router application 215 to interact with the router 220 as if it is running locally on the router 220. It is noted that both of these options (namely, local or remote running of customer application 215) are presented in FIG. 2 and may be used individually or in combination. This may be supported by running the remote procedure call protocol (e.g., gRPC) on the IP stack, such that the router 220 may be accessible via use of IP address and port information in the remote procedure calls. In this manner, the SDK service manager 221 is configured to provide the local router programmability on the router 220 based on the remote procedure calls from the customer router application 215.

It will be appreciated that, although primarily presented herein within the context of embodiments for providing application support for a particular type of device (namely, a router), various example embodiments for providing application support for a router that are presented herein may be used or adapted for use in providing application support for other types of devices (e.g., switches, servers, or any other programmable devices). As such, as discussed further below, various more general embodiments are further presented with respect to FIGS. 3-4.

Figure 3:
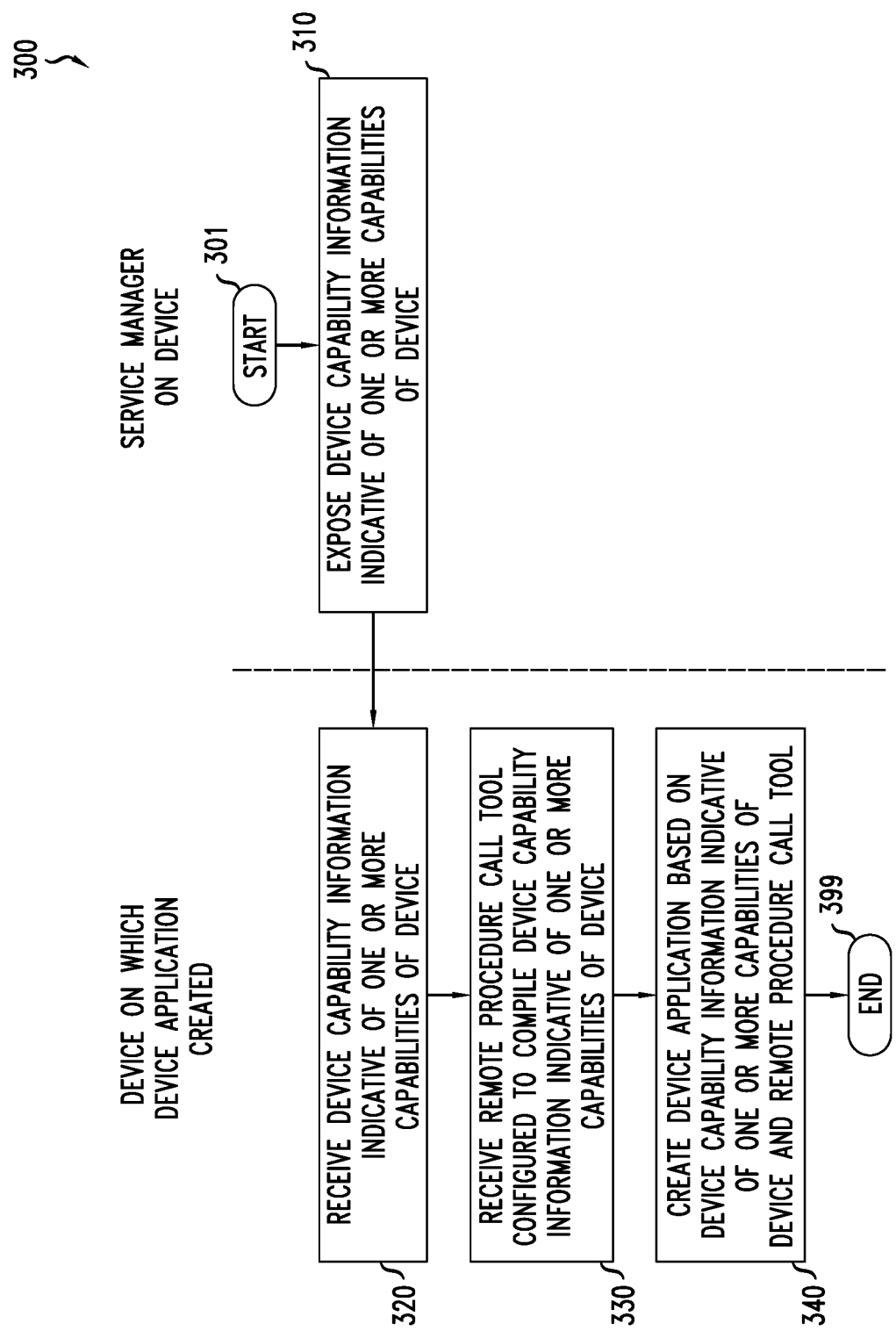
FIG. 3 depicts an example embodiment of a method for supporting development of a device application such as a customer router application.

FIG. 3 depicts an example embodiment of a method for supporting development of a device application. As illustrated in FIG. 3, a portion of the functions are performed by a service manager (e.g., an SDK service manager) on the device for which the device application is created (e.g., the device to be controlled by the device application) and a portion of the functions are performed by a device on which the device application is created (e.g., a customer device of a customer). It will be appreciated that various combinations of functions performed by the respective elements of method 300 also may be considered to be methods supported by the respective elements. It will be appreciated that, although primarily presented as being performed serially, at least a portion of the functions of method 300 may be performed contemporaneously or in a different order than as presented with respect to FIG. 3. At block 301, method 300 begins. At block 310, a service manager of a device exposes device capability information indicative of one or more capabilities of the device. At block 320, the device on which the device application is created receives the device capability information indicative of one or more capabilities of the device. At block 330, the device on which the device application is created receives a remote procedure call tool configured to compile the device capability information indicative of one or more capabilities of the device. At block 340, the device on which the device application is created creates the device application based on the device capability information indicative of one or more capabilities of the device and the remote procedure call tool. At block 399, method 300 ends.

Figure 4:
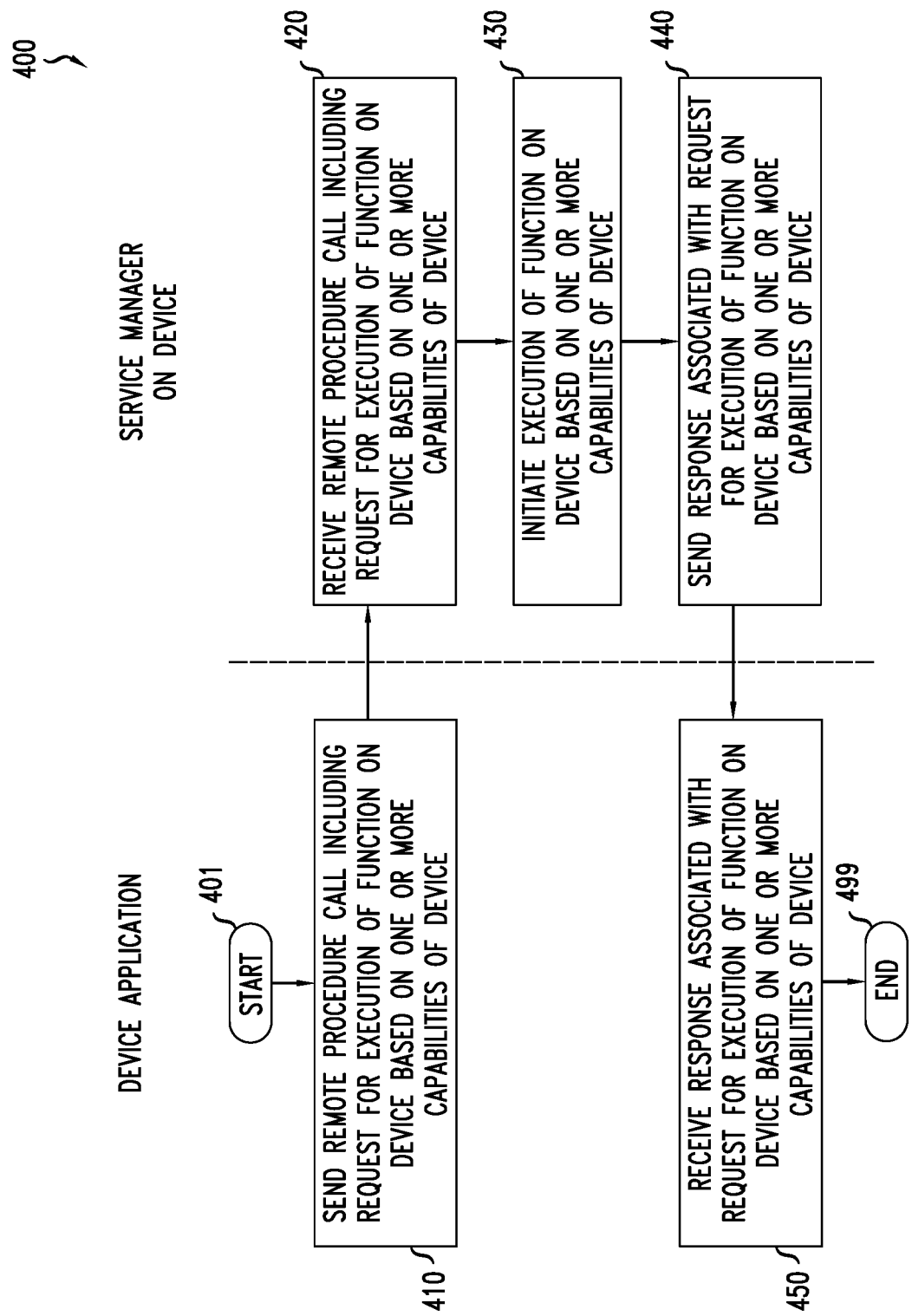
FIG. 4 depicts an example embodiment of a method for supporting use of a device application such as a customer router application.

FIG. 4 depicts an example embodiment of a method for supporting use of a device application. As illustrated in FIG. 4, a portion of the functions are performed by a device application (which may be running local to or remote from the device) and a portion of the functions are performed by a service manager of the device to be controlled by the device application. It will be appreciated that various combinations of functions performed by the respective elements of method 400 also may be considered to be methods supported by the respective elements. It will be appreciated that, although primarily presented as being performed serially, at least a portion of the functions of method 400 may be performed contemporaneously or in a different order than as presented with respect to FIG. 4. At block 401, method 400 begins. At block 410, send, by a device application toward a service manager of a device, a remote procedure call including a request for execution of a function on the device based on one or more capabilities of the device. At block 420, receive, by the service manager of the device, the remote procedure call including the request for execution of the function on the device based on one or more capabilities of the device. At block 430, initiate, by the service manager of the device based on the remote procedure call, execution of the function on the device based on the one or more capabilities of the device. At block 440, send, by the service manager of the device, a response associated with the request for execution of the function on the device based on the one or more capabilities of the device. At block 450, receive, by the device application from the service manager of the device, the response associated with the request for execution of the function on the device based on the one or more capabilities of the device. At block 499, method 400 ends.

Various example embodiments for providing device application support may provide various advantages or potential advantages. For example, various example embodiments for providing device application support may be configured to support device programmability for a customer that is operating a device (e.g., a communication network operator using routers in a communication network, a datacenter operator using routers or servers in the datacenter network, an Enterprise using routers or servers in the Enterprise network, or the like), thereby enabling the customer to run its own code on the device. For example, various example embodiments for providing device application support may be configured to enable a customer that is operating a device to develop and run a customer application on the device without having to use an SDK to develop and run the customer application as use of SDKs by customers for this purpose is often difficult (e.g., since SDK is such a tight methodology, it has to have correct versions of libraries, but different versions may exist on the device and mismatches can cause breakages without giving much, or even any, indication as to why it is broken). For example, various example embodiments for providing device application support may be configured to enable a customer that is operating a device to run a customer application on the device by installing the customer application on the device and running it locally on the device using remote procedure calls on the device or by running the customer application on a customer device remote from the device and using remote procedure calls to enable the customer application to interact with the device as if it is running locally on the device. Various example embodiments for providing device application support may provide various other advantages or potential advantages.

Figure 5:
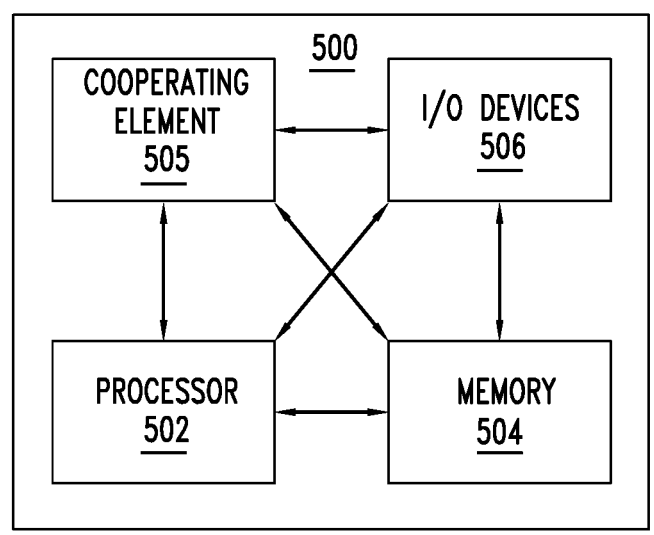
FIG. 5 depicts an example embodiment of a computer suitable for use in performing various functions presented herein.

FIG. 5 depicts an example embodiment of a computer suitable for use in performing various functions described herein.

The computer 500 includes a processor 502 (e.g., a central processing unit, a processor having a set of processor cores, a processor core of a processor, or the like) and a memory 504 (e.g., a random access memory, a read only memory, or the like). The processor 502 and the memory 504 may be communicatively connected. In at least some embodiments, the computer 500 may include at least one processor and at least one memory including program code, wherein the at least one memory and the program code are configured to, with the at least one processor, cause the computer to perform various functions presented herein.

The computer 500 also may include a cooperating element 505. The cooperating element 505 may be a hardware device. The cooperating element 505 may be a process that can be loaded into the memory 504 and executed by the processor 502 to implement functions as discussed herein (in which case, for example, the cooperating element 505 (including associated data structures) can be stored on a non-transitory computer-readable storage medium, such as a storage device or other storage element (e.g., a magnetic drive, an optical drive, or the like)).

The computer 500 also may include one or more input/output devices 506. The input/output devices 506 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 500 may represent a general architecture and functionality suitable for implementing functional elements described herein, portions of functional elements described herein, or the like, as well as various combinations thereof. For example, computer 500 may provide a general architecture and functionality that is suitable for implementing one or more elements presented herein, such as a router 112 or a portion thereof, a management element 113 or a portion thereof, a management device 120 or a portion thereof, a management element 121 or a portion thereof, a customer device 210 or a portion thereof, a router 220 or a portion thereof, a device or a portion thereof configured to execute method 300, a device or a portion thereof configured to execute method 400, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
    at least one processor; and
    at least one memory including computer program code;
    wherein the at least one memory and the computer program code are configured to, with the at least one processor, cause the apparatus to at least:
        receive, by a service manager hosted on a device, a first remote procedure call including a request to register an application with the service manager;
        receive, by the service manager from the application, a second remote procedure call including a request for execution of a function on the device based on one or more capabilities of the device, wherein the function comprises a control function associated with programmability of the device; and
        initiate, by the service manager based on the second remote procedure call, execution of the function on the device based on the one or more capabilities of the device.

2. The apparatus of claim 1, wherein the service manager is configured to provide a software development kit (SDK) service for the device.

3. The apparatus of claim 1, wherein the at least one memory and the computer program code are configured to, with the at least one processor, cause the apparatus to at least:
    expose, by the service manager, device capability information indicative of the one or more capabilities of the device.

4. The apparatus of claim 3, wherein the application is configured based on the device capability information and a remote procedure call tool.

5. The apparatus of claim 1, wherein the application is running on a second device that is remote from the device.

6. The apparatus of claim 1, wherein the application is running on the device.

7. The apparatus of claim 1, wherein the application is a customer application developed by a customer for managing the device when the device is operating in a network of the customer.

8. The apparatus of claim 1, wherein the at least one memory and the computer program code are configured to, with the at least one processor, cause the apparatus to at least:
    receive, by the service manager from the application, a third remote procedure call including at least one of a request to manage a resource on the device or a request to monitor for an event on the device.

9. The apparatus of claim 1, wherein the service manager includes a daemon configured to listen for remote procedure calls.

10. The apparatus of claim 1, wherein at least one of the first remote procedure call or the second remote procedure call is based on gRPC.

11. The apparatus of claim 1, wherein, to initiate execution of the function on the device based on the one or more capabilities of the device, the at least one memory and the computer program code are configured to, with the at least one processor, cause the apparatus to at least:
    convert, by the service manager, the request for execution of the function on the device based on the one or more capabilities of the device into one or more device commands supported by the device; and
    initiate, by the service manager, execution of the one or more device commands supported by the device.

12. The apparatus of claim 1, wherein the at least one memory and the computer program code are configured to, with the at least one processor, cause the apparatus to at least:
    provide, by the service manager toward the application, a response associated with the request for execution of the function on the device based on the one or more capabilities of the device.

13. A method, comprising:
    receiving, by a service manager hosted on a device, a first remote procedure call including a request to register an application with the service manager;
    receiving, by the service manager from the application, a second remote procedure call including a request for execution of a function on the device based on one or more capabilities of the device, wherein the function comprises a control function associated with programmability of the device; and
    initiating, by the service manager based on the second remote procedure call, execution of the function on the device based on the one or more capabilities of the device.

14. An apparatus, comprising:
    at least one processor; and at least one memory including computer program code;
wherein the at least one memory and the computer program code are configured to, with the at least one processor, cause the apparatus to at least:
  send, by an application toward a service manager hosted on a device,
a first remote procedure call including a request to register the application with the service manager;
  send, by the application toward the service manager, a second remote procedure call including a request for execution of a function on the device based on one or more capabilities of the device, wherein the function comprises a control function associated with programmability of the device; and
  receive, by the application from the service manager, a response associated with the request for execution of the function on the device based on the one or more capabilities of the device.

15. The apparatus of claim 14, wherein the service manager is configured to provide a software development kit (SDK) service for the device.

16. The apparatus of claim 14, wherein the application is running on a second device that is remote from the device.

17. The apparatus of claim 14, wherein the application is running on the device.

18. The apparatus of claim 14, wherein the application is a customer application developed by a customer for managing the device when the device is operating in a network of the customer.

19. The apparatus of claim 14, wherein the at least one memory and the computer program code are configured to, with the at least one processor, cause the apparatus to at least:
  send, by the application toward the service manager, a third remote procedure call including at least one of a request to manage a resource on the device or a request to monitor for an event on the device.

20. The apparatus of claim 14, wherein at least one of the first remote procedure call or the second remote procedure call is based on gRPC.

21. The apparatus of claim 14, wherein the at least one memory and the computer program code are configured to, with the at least one processor, cause the apparatus to at least:
  receive, from the device, device capability information indicative of the one or more capabilities of the device;
  receive, from a remote device, a remote procedure call tool; and
  create, based on the device capability information and the remote procedure call tool, the application.

22. A method, comprising:
  sending, by an application toward a service manager hosted on a device, a first remote procedure call including a request to register the application with the service manager;
  sending, by the application toward the service manager, a second remote procedure call including a request for execution of a function on the device based on one or more capabilities of the device, wherein the function comprises a control function associated with programmability of the device; and
  receiving, by the application from the service manager of the device, a response associated with the request for execution of the function on the device based on the one or more capabilities of the device.

* * * * *